(12) United States Patent
Kaul et al.

(10) Patent No.: US 11,868,121 B2
(45) Date of Patent: Jan. 9, 2024

(54) SELF-LEARNING MANUFACTURING USING DIGITAL TWINS

(71) Applicant: International Business Machines Corporation, Armonk, NY (US)

(72) Inventors: Abhishek Kaul, Singapore (SG); Rajesh Ray, Howrah (IN); Seema Nagar, Bangalore (IN); Pramod Vadayadiyil Raveendran, Machiplavu (IN)

(73) Assignee: International Business Machines Corporation, Armonk, NY (US)

( * ) Notice: Subject to any disclaimer, the term of this patent is extended or adjusted under 35 U.S.C. 154(b) by 192 days.

(21) Appl. No.: 17/380,759

(22) Filed: Jul. 20, 2021

(65) Prior Publication Data
US 2023/0022733 A1 Jan. 26, 2023

(51) Int. Cl.
| | |
|---|---|
| *G05B 19/418* | (2006.01) |
| *G05B 13/02* | (2006.01) |
| *G06Q 50/04* | (2012.01) |

(52) U.S. Cl.
CPC ..... *G05B 19/41865* (2013.01); *G05B 13/028* (2013.01); *G06Q 50/04* (2013.01);
(Continued)

(58) Field of Classification Search
CPC ........... G05B 19/41865; G05B 13/028; G05B 2219/31352; G05B 2219/32254; G05B 2219/35009; G06Q 50/04
(Continued)

(56) References Cited

U.S. PATENT DOCUMENTS

| | | |
|---|---|---|
| 10,877,470 B2 | 12/2020 | Burd |
| 2019/0018400 A1 | 1/2019 | McCann |

(Continued)

FOREIGN PATENT DOCUMENTS

| | | |
|---|---|---|
| CN | 112427624 A | 3/2021 |

OTHER PUBLICATIONS

"Analysis of Machine Learning Algorithms in Smart Manufacturing" 2020, Ratnayake et al (Year: 2020).*

(Continued)

*Primary Examiner* — Charles Guiliano
*Assistant Examiner* — Po Han Lee
(74) *Attorney, Agent, or Firm* — Brandon L. Stephens; Christopher M. Pignato

(57) ABSTRACT

Systems, methods, and computer programming products for self-learning order dressing rules applied to manufacturing products in accordance with received product specifications. The translation from commercial characteristics to manufacturing characteristics of the product being manufactured are learned and adjusted to meet the specifications for quality required by the provided commercial characteristics. Reinforcement learning models learn from the quality characteristics of produced products by applying positive scores when the commercial to manufacturing characteristic translation is on-specification, otherwise a penalty is applied when an off-spec product is produced. Digital twins of manufacturing equipment, simulated in real time, provide insight and recommendations for achieving correct quality characteristics. Sensors in each device or within the surrounding environment help digital twins to measure operational performance and lifecycle of the manufacturing equipment against historical baselines. Reinforcement models dynamically adjust equipment settings for producing (Continued)

products to account for equipment performance degradation over time and changes in operation performance.

17 Claims, 6 Drawing Sheets

(52) U.S. Cl.
CPC .............. *G05B 2219/31352* (2013.01); *G05B 2219/32254* (2013.01); *G05B 2219/35009* (2013.01)

(58) Field of Classification Search
USPC ....................................................... 705/7.41
See application file for complete search history.

(56) References Cited

U.S. PATENT DOCUMENTS

| | | |
|---|---|---|
| 2019/0155271 A1* | 5/2019 | Matthews .............. G05B 15/02 |
| 2019/0279097 A1* | 9/2019 | Baines ................ G06F 16/9027 |
| 2020/0242495 A1* | 7/2020 | Roychowdhury ...... B22F 10/36 |
| 2020/0364387 A1 | 11/2020 | Roemerman |
| 2021/0096824 A1* | 4/2021 | Stump ................. G06F 11/3495 |

OTHER PUBLICATIONS

Mell et al., "The NIST Definition of Cloud Computing", Recommendations of the National Institute of Standards and Technology, Special Publication 800-145, Sep. 2011, 7 pages.

Melouk et al., "Simulation optimization-based decision support tool for steel manufacturing", Int. J. Production Economics 141 (2013) 269-276, Available online Aug. 10, 2012, 3 pages.

* cited by examiner

SELF-LEARNING MANUFACTURING USING DIGITAL TWINS

TECHNICAL FIELD

The present disclosure relates generally to the field of machine learning and more specifically to dynamically self-adjusted manufacturing using digital twins and predictive machine learning algorithms.

BACKGROUND

In certain industries, such as the steel industry, it is common for the same input materials to be used for manufacturing a wide variety of different products. These input materials can be converted into many different finished products depending on the manufacturing process and requirements of production. Each customer's order may have unique qualities, requirements and testing needs to ensure that the manufactured products are within prescribed specifications. For example, in the steel industry, a customer's order goes through an order dressing process, wherein a customer's order is converted into a technically feasible order that includes manufacturing characteristics detailing the technical parameters of the materials and output. For instance, characteristics such as mechanical or chemical properties, tolerances, etc. Upon completion of the order dressing steps, the technically feasible order can be sent for production. Once the input materials are converted, for example, the steel is produced as a finished product, quality tests are performed to verify the outputted product's characteristics.

A digital twin is a virtual representation of a physical system, machine, device or other asset. The digital twin tracks changes to the physical asset across the asset's lifespan and records changes to the asset as they occur. Digital twins are a complex virtual model that is an exact counterpart to the physical asset existing in real space. Sensors, recording devices, and internet-of-things (IoT) devices connected to the physical asset collect data, often in real-time. The collected data can then be mapped to the virtual model of the digital twin. Any individual with access to the digital twin can see the real-time information about the physical asset operating in the real world without having to be physically present and viewing the physical asset while operating. Rather, users such as engineers can use the digital twin to understand not only how the physical asset is performing, but to predict how the physical asset may perform in the future, using the collected data from sensors, IoT devices and other sources of data and information being collected. Moreover, digital twins can help manufacturers and providers of physical assets with information that helps the manufacturer understand how customers continue to use the products after the purchasers have bought the physical asset.

SUMMARY

Embodiments of the present disclosure relate to a computer-implemented method, an associated computer system and computer program products for dynamically adjusting manufacturing characteristics to produce an on-specification product. The computer-implemented method comprises the steps of developing, by a processor, a reinforcement learning model using a historical rules database comprising existing rules for translating commercial characteristics of a product into manufacturing characteristics, and historical production settings comprising quality parameters achieved during historical production of on-specification products in accordance with the existing rules; inputting, by the processor, a set of commercial characteristics to produce the product into the reinforcement learning model; receiving, by the processor, output from the reinforcement learning model translating the set of commercial characteristics into manufacturing characteristics for producing the product; recording, by the processor, quality characteristics of product produced by one or more manufacturing systems and production settings of the one or more manufacturing systems used to produce the product; comparing, by the processor, the quality characteristics of the product produced by the one or more manufacturing systems with the commercial characteristics of the product; and rewarding, by the processor, the reinforcement learning model for correctly translating the commercial characteristics to the manufacturing characteristics, whereupon the quality characteristics of the product match the commercial characteristics.

BRIEF DESCRIPTION OF THE DRAWINGS

The drawings included in the present disclosure are incorporated into, and form part of, the specification. The drawings illustrate embodiments of the present disclosure and, along with the description, explain the principles of the disclosure. The drawings are only illustrative of certain embodiments and do not limit the disclosure.

DETAILED DESCRIPTION

Figure 1:
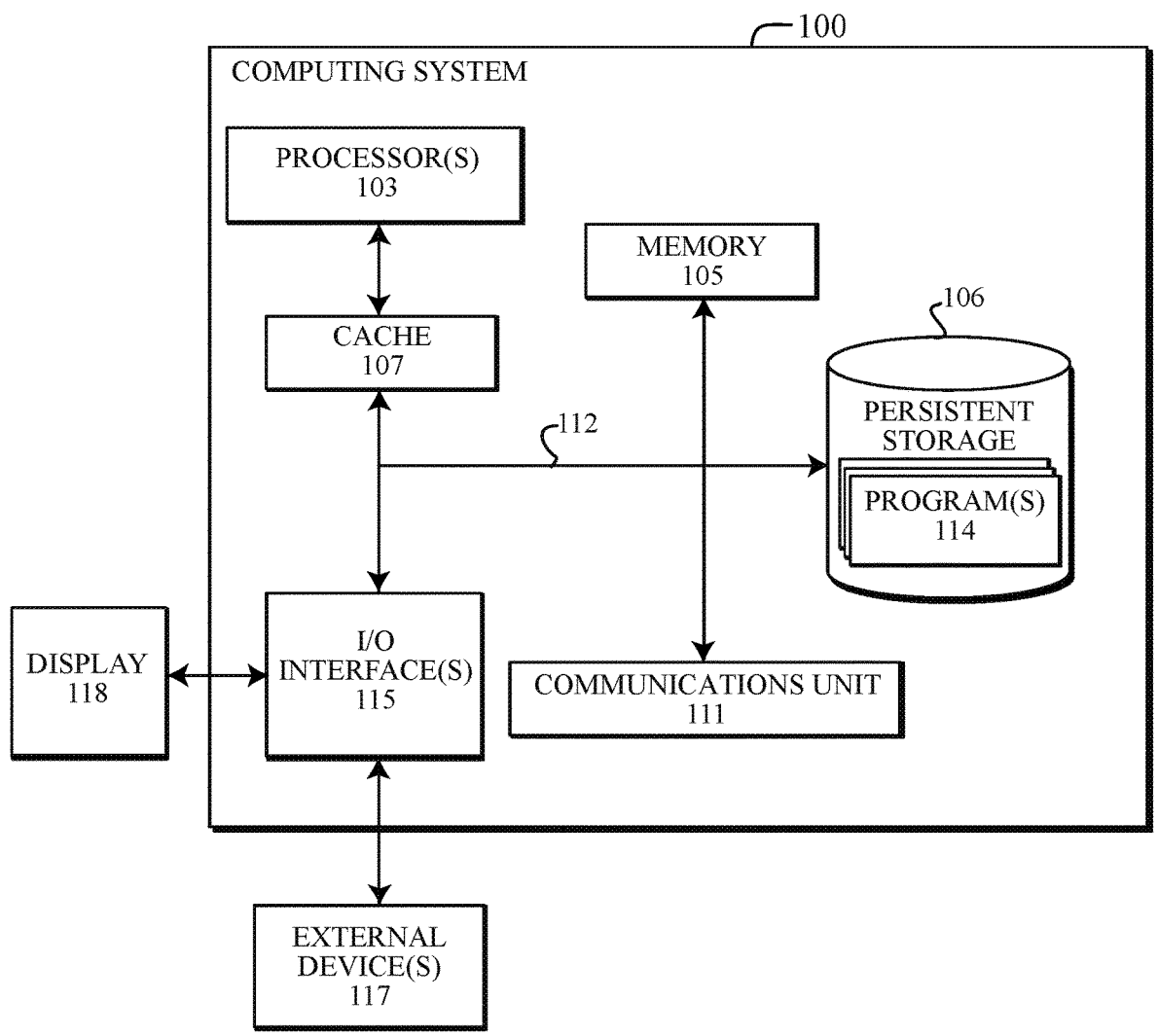
FIG. 1 depicts a block diagram illustrating internal and external components of an embodiment of a computing system in which embodiments described herein may be implemented in accordance with the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The corresponding structures, materials, acts, and equivalents of all means or steps plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments chosen and described are in order to best explain the principles of the disclosure, the practical applications and to enable others of ordinary skill in the art to understand the disclosure for various embodiments with various modifications as are suited to the particular use contemplated.

OVERVIEW

Embodiments of the present disclosure recognize that traditional order dressing processes typically apply static order dressing rules to incoming production orders with specific commercial characteristics. The static rules for order dressing do not change over time in response to changes in operating conditions of the manufacturing systems, variations in material grades and material changeovers. As a result of the rules' static nature, this can cause off specification production of the manufactured products by 20-30% (or more) in some instances. The variation in quality outside of requested commercial characteristics can be due to multiple factors. For instance, factors affecting non-conformity of final products can include wear and tear on manufacturing equipment over time due to usage of the equipment as well as changes in raw material composition from batch to batch of material inputs, which can cause variations in the produced product outside of acceptable product specifications inputted by the customers. To adjust for the variations in final products due to degradation of the manufacturing equipment and/or the materials being used during the manufacturing of the final product, manual changes must be introduced to the processing parameters that anticipate a need to compensate for the effects of the equipment and materials. Precise changes to the processing parameters can be subjective and based on human experience. Therefore, there is a need for a system, method and computer program products that can automate and predictively adjust processing parameters and material inputs consistently during the manufacturing process to maintain manufacturing characteristics of final products within the specification of customers' commercial characteristics prescribed by received order.

Embodiments of the present disclosure leverage the use of machine learning algorithms, sensor technology integrated into manufacturing equipment and/or the surrounding environment and digital twin technology, to dynamically self-adjust the translation of commercial characteristics of a product to manufacturing characteristics during order dressing, to successfully achieve manufactured products comprising a measurable quality characteristics consistent with requested commercial characteristics. Embodiments of the present disclosure may develop a reinforcement learning model using a historical rules database containing quality parameters for order dressing one or more products manufactured by one or more manufacturing systems. New features of the learning model may be learned using unsupervised learning during the development of the model, and reinforcement learning following production of the products by the manufacturing systems. As production requests are received, the received sets of commercial characteristics are inputted into the reinforcement learning model. Using the current rules of the rules database, and historical production records database describing previous production settings for successful product production, the reinforcement learning module may output a translation of the set of inputted commercial characteristics into manufacturing characteristics expected to provide a maximum award to the agent of the reinforcement learning model.

Upon completion of product production, embodiments of the present disclosure are able to refine and/or adjust the reinforcement learning model by measuring and recording the quality characteristics of the product that was produced and the production settings applied by the manufacturing control system(s) producing the products. If the comparison of the quality characteristics of the product produced match the commercial characteristics specified, the reinforcement learning model can be rewarded to incentivize continued use of the correct translation of the commercial characteristics to manufacturing characteristics that resulted in the correct quality by the final output of the manufacturing system(s). Moreover, in instances wherein the production settings of the manufacturing systems result in a product having measurable quality characteristics that do not match the commercial characteristics of the production order, the reinforcement learning model may be fine-tuned and adjusted based on accuracy metrics and to account for changes in operating conditions that resulted in the unacceptable variation in the quality of the produced product.

In some embodiments, the operational conditions and/or changes to the performance and lifecycle of the manufacturing systems may be tracked and monitored using digital twin models and/or simulations. The digital twin models can be constantly updated to reflect the current operating conditions of the manufacturing systems in real time, and stream performance data, simulation data, lifecycle information, insights and recommendations that may be taken into consideration by the reinforcement learning model during model training and/or updates to the model over time when selecting which order dressing rules to apply. Sensor devices integrated into the manufacturing systems and positioned within the surrounding environment can collect manufacturing system performance data and operation metrics, monitor the changes in performance of the manufacturing systems in real time, including changes resulting in decreased performance over time. Digital twins may collect the data during actual production of products or run simulated production runs; offering insights or recommendations to the reinforcement learning model. The reinforcement learning model can analyze the digital twin data to determine how to compensate for the changes in manufacturing system performance by adjusting manufacturing characteristics, such as manufacturing equipment settings, during the translation of commercial characteristics to manufacturing characteristics, as described herein. Moreover, digital twins can also alert operators of the manufacturing systems about faulty or failing parts, settings or configuration adjustments that may modify or impact performance and suggest upgrades or replacement parts that may return the manufacturing system to previous optimal performance and/or improved operational performance.

Computing System

FIG. 1 illustrates a block diagram of an embodiment of a computing system 100, which may be a simplified example of a computing device (i.e., a physical bare metal system or virtual system) capable of performing the computing operations described herein for dynamically augmenting manufacturing characteristics configured to produce an on-specification product. Computing system 100 may be representative of the one or more computing systems or devices implemented as part of computing environments depicted in FIGS. 2-5, in accordance with the embodiments of the present disclosure and further described below in detail. It should be appreciated that FIG. 1 provides only an illustration of one implementation of a computing system 100 and does not imply any limitations regarding the environments in which different embodiments may be implemented. In general, the components illustrated in FIG. 1 may be representative of any electronic device, either physical or virtualized, capable of executing machine-readable program instructions.

Although FIG. 1 shows one example of a computing system 100, a computing system 100 may take many different forms, including bare metal computer systems, virtualized computer systems, container-oriented architecture, microservice-oriented architecture, etc. For example, computing system 100 can take the form of real or virtualized systems, including but not limited to desktop computer systems, laptops, notebooks, tablets, servers, client devices, network devices, network terminals, thin clients, thick clients, kiosks, mobile communication devices (e.g., smartphones), multiprocessor systems, microprocessor-based systems, minicomputer systems, mainframe computer systems, smart devices, sensor device, recording devices, and/or Internet of Things (IoT) devices. The computing systems 100 can operate in a local computing environment, networked computing environment, a containerized computing environment comprising one or more pods or clusters of containers, and/or a distributed cloud computing environment, which can include any of the systems or devices described herein and/or additional computing devices or systems known or used by a person of ordinary skill in the art.

Computing system 100 may include communications fabric 112, which can provide for electronic communications among one or more processor(s) 103, memory 105, persistent storage 106, cache 107, communications unit 111, and one or more input/output (I/O) interface(s) 115. Communications fabric 112 can be implemented with any architecture designed for passing data and/or controlling information between processor(s) 103 (such as microprocessors, CPUs, and network processors, etc.), memory 105, external devices 117, and any other hardware components within a computing system 100. For example, communications fabric 112 can be implemented as one or more buses, such as an address bus or data bus.

Memory 105 and persistent storage 106 may be computer-readable storage media. Embodiments of memory 105 may include random access memory (RAM) and/or cache 107 memory. In general, memory 105 can include any suitable volatile or non-volatile computer-readable storage media and may comprise firmware or other software programmed into the memory 105. Program(s) 114, software applications, processes, services, and installed components thereof, described herein, may be stored in memory 105 and/or persistent storage 106 for execution and/or access by one or more of the respective processor(s) 103 of the computing system 100.

Persistent storage 106 may include a plurality of magnetic hard disk drives, solid-state hard drives, semiconductor storage devices, read-only memories (ROM), erasable programmable read-only memories (EPROM), flash memories, or any other computer-readable storage media that is capable of storing program instructions or digital information. Embodiments of the media used by persistent storage 106 can also be removable. For example, a removable hard drive can be used for persistent storage 106. Other examples include optical and magnetic disks, thumb drives, and smart cards that are inserted into a drive for transfer onto another computer-readable storage medium that is also part of persistent storage 106.

Communications unit 111 provides for the facilitation of electronic communications between computing systems 100. For example, between one or more computer systems or devices via a communication network. In the exemplary embodiment, communications unit 111 may include network adapters or interfaces such as a TCP/IP adapter cards, wireless interface cards, or other wired or wireless communication links. Communication networks can comprise, for example, copper wires, optical fibers, wireless transmission, routers, load balancers, firewalls, switches, gateway computers, edge servers, and/or other network hardware which may be part of, or connect to, nodes of the communication networks including devices, host systems, terminals or other network computer systems. Software and data used to practice embodiments of the present disclosure can be downloaded to the computing systems 100 operating in a network environment through communications unit 111 (e.g., via the Internet, a local area network, or other wide area networks). From communications unit 111, the software and the data of program(s) 114 can be loaded into persistent storage 116.

One or more I/O interfaces 115 may allow for input and output of data with other devices that may be connected to computing system 100. For example, I/O interface 115 can provide a connection to one or more external devices 117 such as one or more smart devices, IoT devices, recording systems such as camera systems or sensor device(s), input devices such as a keyboard, computer mouse, touch screen, virtual keyboard, touchpad, pointing device, or other human interface devices. External devices 117 can also include portable computer-readable storage media such as, for example, thumb drives, portable optical or magnetic disks, and memory cards. I/O interface 115 may connect to human-readable display 118. Human-readable display 118 provides a mechanism to display data to a user and can be, for example, computer monitors or screens. For example, by displaying data as part of a graphical user interface (GUI). Human-readable display 118 can also be an incorporated display and may function as a touch screen, such as a built-in display of a tablet computer.

The present invention may be a system, a method, and/or a computer program product at any possible technical detail level of integration. The computer program product may include a computer-readable storage medium (or media) having the computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other devices to cause a series of operational steps to be performed on the computer, other programmable apparatus, or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

System for Dynamically Augmenting Manufacturing Characteristics Configured to Produce an on-Specification Product It will be readily understood that the instant components, as generally described and illustrated in the Figures herein, may be arranged and designed in a wide variety of different configurations. Accordingly, the following detailed description of the embodiments of at least one of a method, apparatus, non-transitory computer readable medium and system, as represented in the attached Figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the Figures, any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

Referring to the drawings, FIG. 2 to FIG. 5 depict an approach that can be executed using one or more computing systems 100 operating within a computing environment 200, 300, 400 and variations thereof, to implement systems, methods, and computer program products for dynamically augmenting and adjusting the translation of commercial characteristics of a production order to manufacturing characteristics implemented by manufacturing systems using a reinforcement learning model 215. Embodiments of computing environments 200, 300, 400 may include one or more computing systems 100 interconnected via a computer network 250. In the exemplary embodiments depicted in FIGS. 2-3. the computing systems 100 connected to the computing network 250 may be specialized systems or devices that may include, but are not limited to, the interconnection of one or more order processing node 201, digital twin node 203, customer device 205, manufacturing asset(s) 207, environmental monitoring device(s) and one or more network-accessible databases 237, 239. While order processing node 201, digital twin node 203, customer device 205, manufacturing asset(s) 207, environment monitoring device(s) 235 and one or more network-accessible databases 237, 239 may be interconnected via network 250 as shown, other types of computing systems and devices known or used by a person skilled in the art, may be interconnected as well and/or may be substituted for the computing systems depicting in the drawings.

Embodiments of the specialized computing systems or devices exemplified in FIGS. 2-5 may not only comprise the elements and components of the systems and devices depicted in the exemplary embodiments of FIGS. 2-5 as shown, but the specialized computing systems depicted may further incorporate one or more elements or components of computing system 100 shown in FIG. 1 and described above. Although not shown in the Figures, one or more elements of computing system 100 may be integrated into the embodiments of order processing node 201, digital twin node 203, customer device 205, manufacturing asset(s) 207, and environment monitoring device(s) 235, wherein the components integrated into the specialized computing systems include (but are not limited to) one or more processor(s) 103, program(s) 114, memory 105, persistent storage 106, cache 107, communications unit 111, I/O interface(s) 115, external device(s) 117 and human-readable display 118.

Embodiments of network 250 may be constructed using wired, wireless or fiber-optic connections. Order processing node 201, digital twin node 203, customer device 205, manufacturing asset(s) 207, environment monitoring device (s) 235 and systems maintaining one or more network-accessible databases 237, 239, whether real or virtualized, may communicate over the network 250 via a communications unit 111, such as a network interface controller, network interface card, network transmitter/receiver or other network communication device capable of facilitating communication across network 250. In some embodiments of computing environments 200, 300, 400, order processing node 201, digital twin node 203, customer device 205, manufacturing asset(s) 207, environment monitoring device(s) 235 and systems maintaining one or more network-accessible databases 237, 239, may represent computing systems 100 utilizing clustered computing and components acting as a single pool of seamless resources when accessed through network 250. For example, such embodiments can be used in a datacenter, cloud computing network, storage area network (SAN), and network-attached storage (NAS) applications.

Embodiments of the communications unit 111 such as the network transmitter/receiver may implement specialized electronic circuitry, allowing for communication using a specific physical layer and a data link layer standard. For example, Ethernet, Fiber channel, Wi-Fi or other wireless radio transmission signals, cellular transmissions or Token Ring to transmit data between order processing node 201, digital twin node 203, customer device 205, manufacturing asset(s) 207, environment monitoring device(s) 235 and systems maintaining one or more network-accessible databases 237, 239 connected to network 250. Communications unit 111 may further allow for a full network protocol stack, enabling communication over network 250 to groups of computing systems 100 linked together through communication channels of network 250. Network 250 may facilitate communication and resource sharing among order processing node 201, digital twin node 203, customer device 205, manufacturing asset(s) 207, environment monitoring device(s) 235 and systems maintaining one or more network-accessible databases 237, 239 connected to the network 250. Examples of network 250 may include a local area network (LAN), home area network (HAN), wide area network (WAN), backbone networks (BBN), peer to peer networks (P2P), campus networks, enterprise networks, the Internet, cloud computing networks, wireless communication networks and any other network known by a person skilled in the art.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
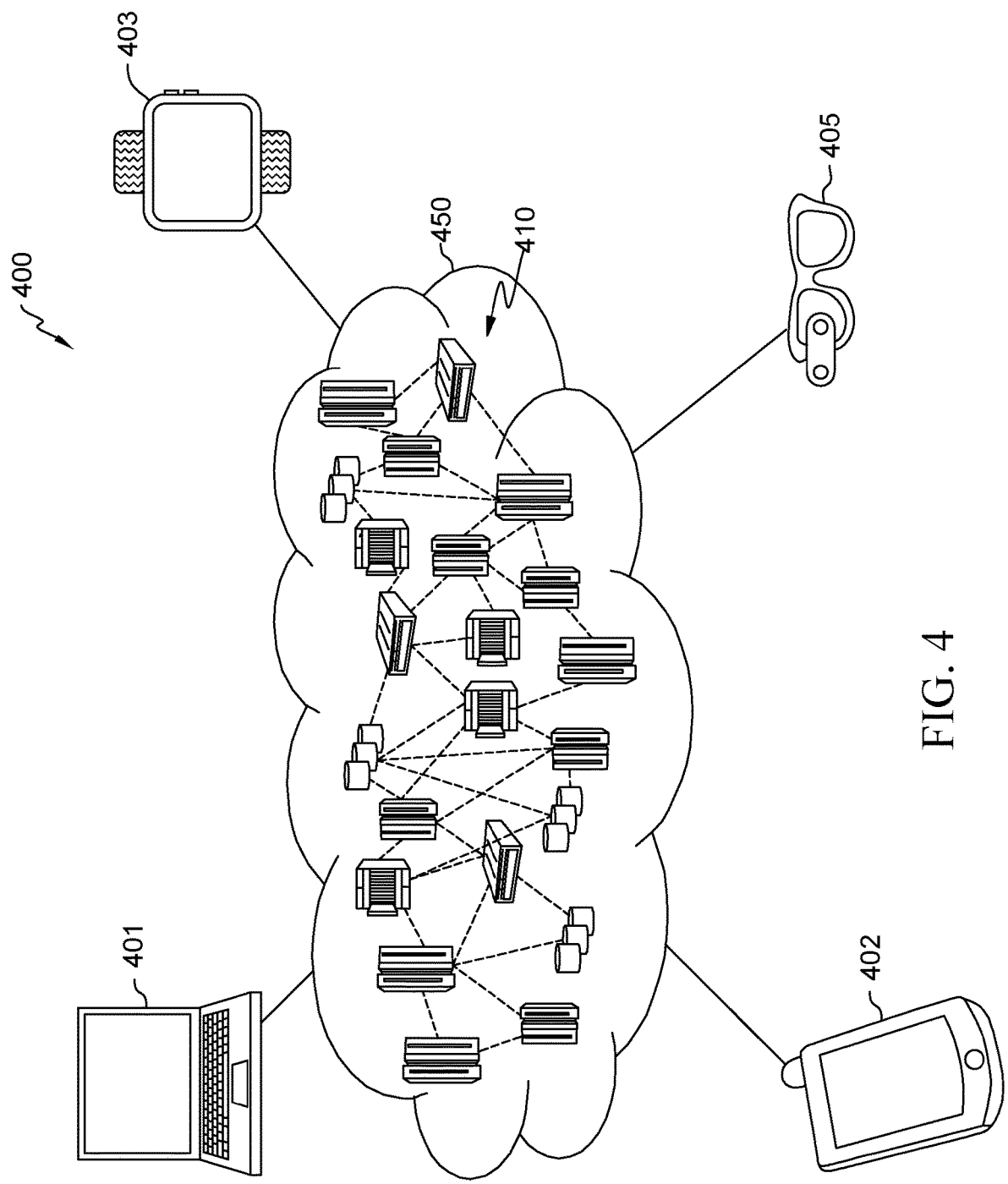
FIG. 4 depicts a block diagram illustrating a cloud computing environment in accordance with the present disclosure.

Referring to the drawings, FIG. 4 is an illustrative example of a cloud computing environment 400. As shown, cloud computing environment 400 includes a cloud network 450 comprising one or more cloud computing nodes 410 with which end user devices may be used by cloud consumers to access one or more software products, services, applications, and/or workloads provided by cloud service providers. Examples of the end user devices are depicted and may include devices such as a smartphone 402 or cellular telephone, desktop computers, laptop computer 401, smart devices such as smartwatch 403 and smart glasses 405. Nodes 410 may communicate with one another and may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of end user devices shown in FIG. 4 are intended to be illustrative only and that computing nodes 410 of cloud computing environment 400 can communicate with any type of computerized device over any type of network and/or network addressable connection (e.g., using a web browser).

Figure 5:
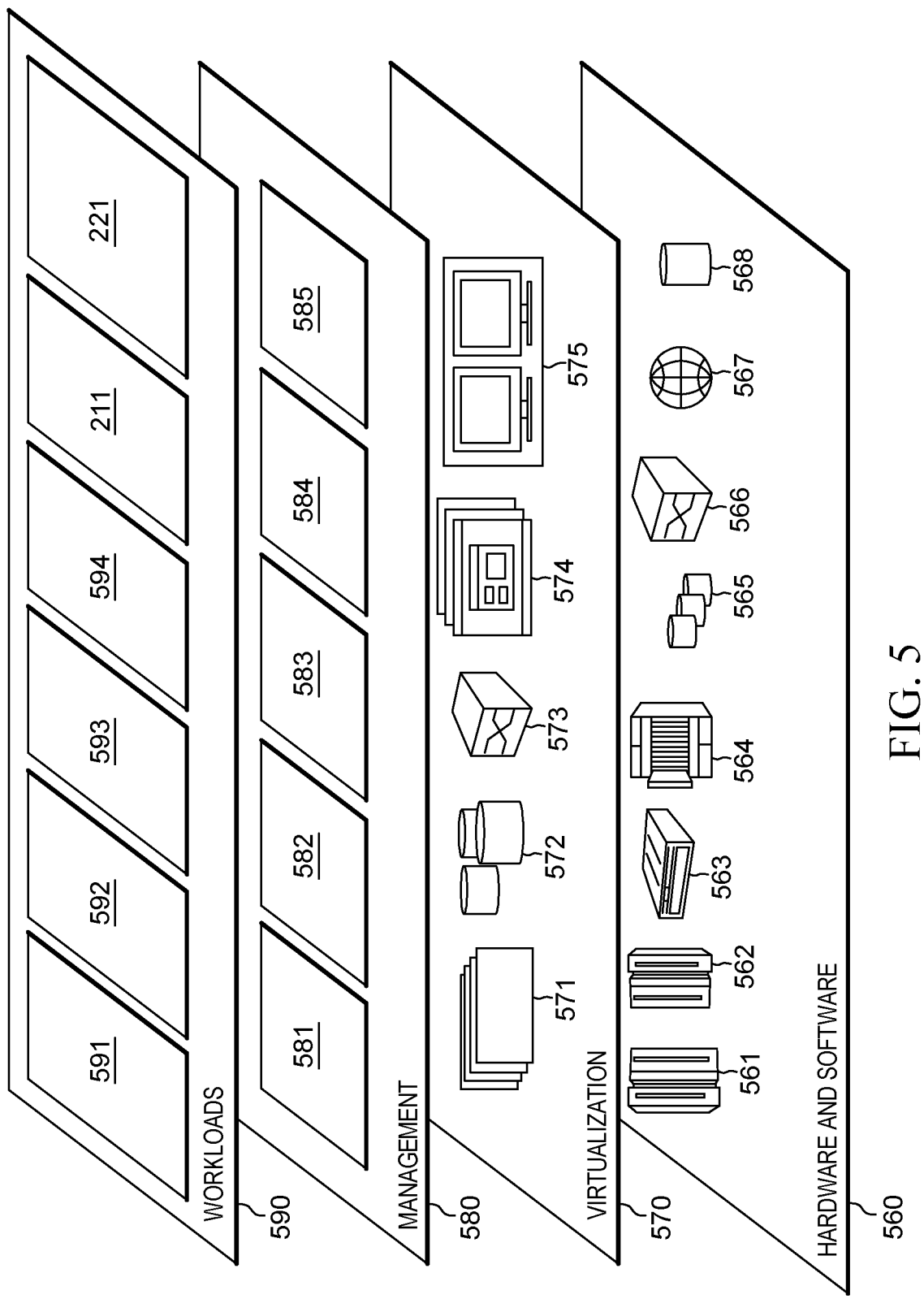
FIG. 5 depicts an embodiment of abstraction model layers of a cloud computing environment in accordance with the present disclosure.

Referring now to FIG. 5, a set of functional abstraction layers provided by cloud computing environment 400 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 560 includes hardware and software components. Examples of hardware components include mainframes 561; RISC (Reduced Instruction Set Computer) architecture-based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities may be provided: virtual servers 571; virtual storage 572; virtual networks 573, including virtual private networks; virtual applications and operating systems 574; and virtual clients 575.

Management layer 580 may provide the functions described below. Resource provisioning 581 provides dynamic procurement of computing resources and other resources that are utilized to perform tasks within the cloud computing environment 400. Metering and pricing 582 provide cost tracking as resources are utilized within the cloud computing environment 400, and billing or invoicing for consumption of these resources. In one example, these resources can include application software licenses. Security provides identity verification for cloud consumers and tasks, as well as protection for data and other resources. User portal 583 provides access to the cloud computing environment 400 for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA.

Workloads layer 590 provides examples of functionality for which the cloud computing environment may be utilized. Examples of workloads and functions which may be provided from this layer include software development and lifecycle management 591, data analytics processing 592, multi-cloud management 593, transaction processing 594; order dressing module 211 and digital twin module 221.

Figure 2:
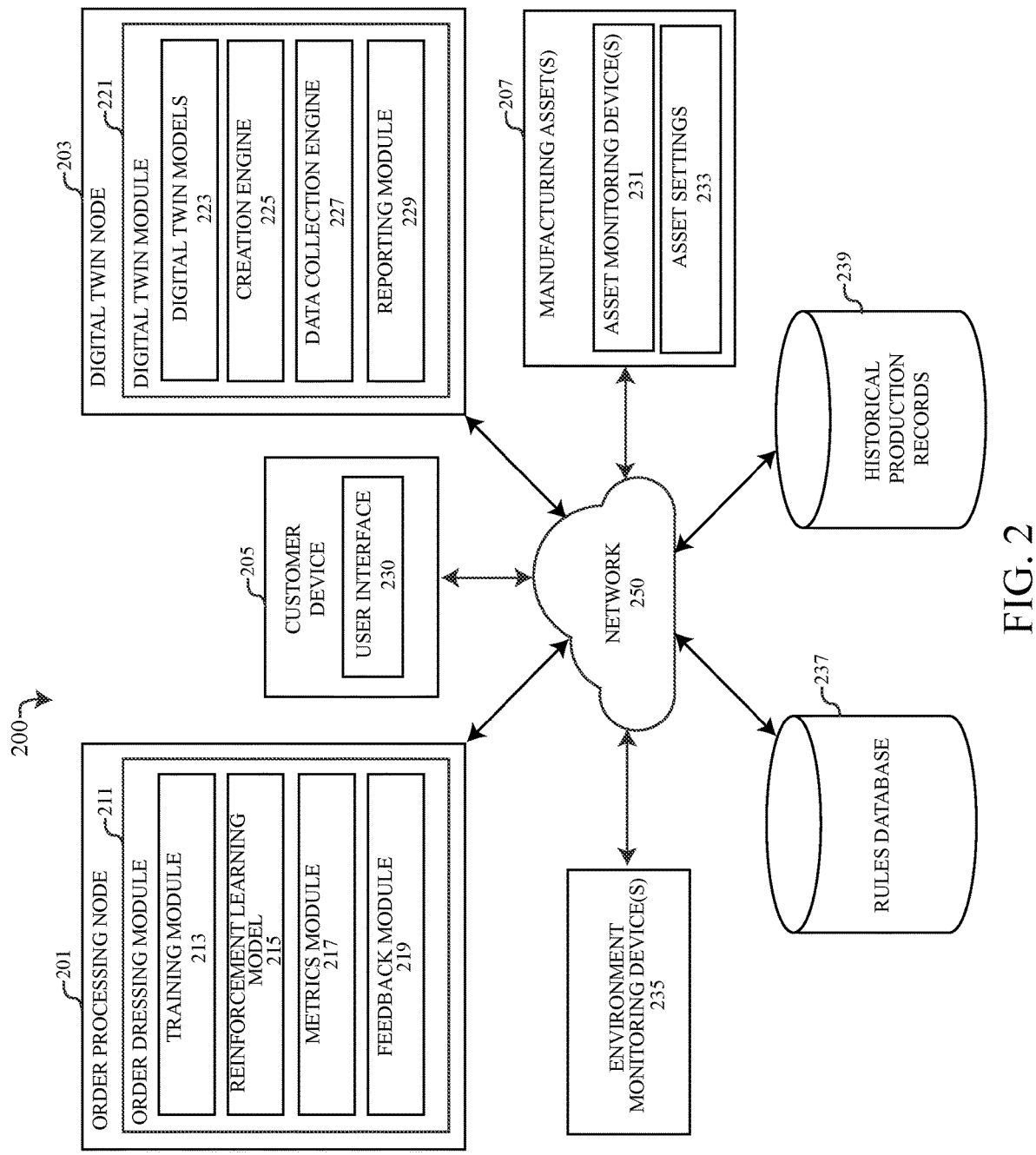
FIG. 2 depicts a functional block diagram describing an embodiment of a computing environment for dynamically adjusting manufacturing characteristics to produce an on-specification product in accordance with the present disclosure.

Referring back to the drawings, FIG. 2 illustrates an embodiment of a computing environment 200 capable of dynamically augmenting and adjusting the translation of commercial characteristics of a production order to manufacturing characteristics that can be utilized by manufacturing assets 207 during the manufacture of products, using a reinforcement learning model 215. Embodiments of the computing environment 200 depicts a de-centralized computing architecture comprising a distribution of real or virtualized computing nodes communicating with one another across network 250. A "node" of network 250 may refer to a connection point, redistribution point or a communication endpoint of the network 250. In the exemplary embodiment, computing environment 200 may comprise nodes such as an order processing node 201, digital twin node 203, customer device 205, one or more manufacturing systems comprising one or more manufacturing asset(s) 207, environment monitoring device(s) 209, a rules database 237 and/or a database comprising historical production records 239. In alternative embodiments, the computing environment 200 may utilize a centralized computing architecture instead of decentralized architecture as depicted. For example, using a client/server architecture wherein one or more client nodes, such as the customer device 205 access the order processing and digital twin functionalities of the computing environment via a centralized host system such as a server.

Embodiments of order processing node 201 may be a connection point of the network 250 responsible for order dressing production requests into technically feasible orders with manufacturing parameters and characteristics. The product production requests may comprise a set of commercial characteristics that can be translated from the received commercial characteristics into manufacturing characteristics suitable for production into the requested product being manufactured. For example, commercial characteristics may include production information, including but not limited to the best production route for manufacturing, equipment settings such as processing time, the number of passes, etc., quality parameters such as the chemical, mechanical and tolerance characteristics, marking and testing required for finished products, and material requirements. Embodiments of the order processing node 201 may receive the commercial characteristics of a product as input from one or more systems connected to network 250. Input into the order processing node 201 may originate from a customer device 205, an enterprise resource planning (ERP) system, or another type of system connected to network 250. As shown in FIG. 2, the customer device 205 or ERP may include a user interface 230 or an application programming interface (API) capable of communicating requests comprising commercial characteristics to the order processing node 201.

Embodiments of the order processing node 201 may be capable of dynamically performing self-adjustable order dressing procedures to the commercial characteristics of the product requests inputted into the order processing node 201. Embodiments of the order processing node 201 may comprise an order dressing module 211, which may be capable of dynamically developing, training, and applying a reinforcement learning model 215 to the commercial characteristics of the production requests, track metrics gathered during manufacturing of the products, including operating conditions and insights from digital twin node 203 and use feedback about outputted quality of the finished product to improve the reinforcement learning model 215. The term "module" may refer to a hardware module, software module, or a module may be a combination of hardware and software resources. Embodiments of hardware-based modules may include self-contained components such as chipsets, specialized circuitry, one or more memory 105 devices and/or persistent storage 106. A software-based module may be part of a program 114, program code or linked to program code containing specifically programmed instructions loaded into a memory 105 device or persistent storage 106 device of one or more specialized computing systems 100 operating as part of the computing environment 200. In some embodiments, order dressing module 211 may include sub-modules or sub-components performing one or more specialized tasks, processes or functions of the order dressing module 211. For instance, in the exemplary embodiment depicted in FIG. 2, the order dressing module 211 comprises a training module 213, reinforcement learning model 215, metrics module 217 and a feedback module 219.

Embodiments of the training module 213 may perform functions, tasks or processes of the order dressing module 211 associated with developing, training and/or updating reinforcement learning model 215. The creation and/or refinement of the reinforcement learning model 215 by the training module 213 may be performed using data that may be collected from a plurality of data sources. For example, the training module 213 may develop or refine the reinforcement learning model 215 using the rules of a rules database 237, and historical production records 239 comprising previous production runs using one or more of the manufacturing asset(s) 207 connected to network 250. Training module 213 may implement one or more reinforcement learning techniques to develop and update the reinforcement learning model 215. "Reinforcement learning" may refer to the training of reinforcement learning models 215 to make sequences of decisions directed toward the production of requested products. AI agents implementing the reinforcement learning model 215 learn to achieve production of the requested products using a game-like process of attributing rewards and penalties. The reinforcement learning model 215 employs trial and error to come up with the best solutions for creating the requested products within the specifications provided, while maximizing the rewards received for producing an on-specification product that meets the requested quality parameters, and thus a successful translation of the commercial characteristics. Over time the agent learns to avoid negative punishments and seek positive reinforcement.

Embodiments of the training module 213 may train or update reinforcement learning model 215 using historical rules of rules database 237 in conjunction with historical production records 239. Embodiments of rules database 237 may include an existing set of rules for treating incoming production orders with specified quality parameters during the order dressing phase of manufacturing. Moreover, a database comprising historical production records 239 may further be applied by the training module 213 while training or updating the reinforcement learning model 215. Historical production records 239 can include historical information describing previously manufactured products, including data and/or metadata describing the materials used, process parameters and constraints, the order dressing rules applied, conditions of the manufacturing asset(s) 207 used during production, and the measurable quality of the product that was outputted.

Reinforcement learning model 215 may perform the tasks or functions of translating commercial characteristics of product orders received from customer device 205 to manufacturing characteristics predicted to result in an outcome that meets the product quality characteristics of the commercial characteristics submitted by the customer device 205, when manufactured using one or more manufacturing asset(s) 207. The reinforcement learning model 215 uses math, data and computer instructions taught using training module 213 to create representations of real-world events (i.e., implementing a manufacturing process) in accordance with the business rules of rules database 237 for achieving the manufacturing goals. In the exemplary embodiment of computing environments 200, 300, 400, the reinforcement learning model 215 predicts the appropriate business rules of the rules database to apply to commercial characteristics in order to translate commercial characteristics into manufacturing characteristics capable of instructing manufacturing assets 207 how to complete the requested product within the quality specifications prescribed by the order.

Predictions performed by the reinforcement learning model 215 can be made by considering historical production records 239 of previous manufacturing jobs that may be similar to the current request, as well as adjust predictions in view of the historical production records 239 to compensate for changes in the type or quality of materials being used, changes in the operating conditions of the manufacturing assets 207 including degradation to the manufacturing assets 207 over time. Based on the history of input material grades used, the measured output quality produced, process parameters and machine conditions, the reinforcement learning model 215 can establish a co-relation to the between the historical records and current production requests, then recommend the correct inputs and process parameters during order dressing phase of manufacturing to increase the probability that the output quality of the product being produced by the manufacturing asset(s) 207 is correct on the first pass.

For example, in a situation where an operator has set up business rules within a rules database 237 for order dressing a product that includes a thin sheet of steel based on the input material, and quality of the output needed, the reinforcement learning model 215 can learn to adjust the operator's original business rules within the rules database 237 to achieve the same quality expected but, may further predict how to alter or adjust the business rules to compensate for changes in the manufacturing asset's 207 degraded performance over time and/or changes in operating conditions from the point in time the rule was first entered into the rules database 237. For instance, in the original business rules, the rule may call for conversion of a flat sheet of steel to a thin sheet of steel by passing the flat sheet through a roller ten times. However, over time and training of the reinforcement learning model 215, the reinforcement learning model 215 may receive input from actual production sequences of flat sheet conversions to thin sheet conversions and infer degradation of the manufacturing asset 207 (i.e., the roller in this example) and adjust the rule to compensate the degradation while still achieving the required thickness of the thin sheet of steel. For example, by modifying the original business rule calling for the flat sheet to pass through the roller ten time, to now require that the flat sheet pass through the roller twelve times during production of the thin sheet.

Embodiments of the reinforcement learning model 215 can be further trained by training module 213 using one or more metrics gathered by metrics module 217. The metrics module 217 may be responsible for gathering a variety of performance data and/or metadata, measurements of from one or more manufacturing assets 207 and/or surrounding environments of the manufacturing assets 207. For example, metrics module 217 can gather performance data, metadata and measurements from asset monitoring devices 231 positioned upon or integrated into the manufacturing asset(s) 207, as well as environment monitoring devices 235 positioned within the surrounding environment where manufacturing asset(s) 207 operate. Examples of monitoring devices 231, 235 may include sensor devices, recording devices such as cameras and other types of audio or video recorders, as well as IoT devices. In some embodiments, the data metrics outputted by the monitoring devices 231, 235 may be transmitted to the metrics module 217, where the collected data may be stored or processed for storage in one or more data structures, such as a database.

In some embodiments, the metrics module 217 may gather insights, simulation results, performance information, and operational changes of the manufacturing assets 207 from one or more digital twin nodes 203, tasked with creating and updating digital twin models 223 of the manufacturing asset(s) 207. Metrics received from digital twin node 203 by the metrics module 217 can be further used to train and/or update the reinforcement learning model 215. Digital twin node 203 of network 250 may provide digital twin services via the digital twin module 221 to order processing node 201 via the metrics module 217 connecting and accessing the digital twin module 221 through an interface or API. Embodiments of the metrics module 217 and/or other computing systems of network 250 may execute program code of the digital twin module 221 to perform one or more functions or operations of the digital twin module 221, including, but not limited to retrieving and creating digital twin models 223, aggregating and organizing data generated by asset monitoring devices 231 and environment monitoring devices 235 of the manufacturing asset(s) 207, simulating changes in operating conditions of the manufacturing asset(s) 207 via the digital twin using one or more digital twin models 223, and reporting insights, performance, simulation results and recommendations to the order processing node 201.

One or more individual functions or features of the digital twin module 221 may be implemented by one or more subprocesses or sub-modules of the digital twin module 221. For example, the exemplary embodiment of the digital twin module 221 may comprise a creation engine 225, data collection engine 227, and reporting module 229. Embodiments of the creation engine 225 may perform tasks or functions associated with creating a digital twin models 223 reflecting a current state of a manufacturing asset 207. In some embodiments, initial versions of the digital twin models 223 depicting the base form of a manufacturing asset 207 provided by the manufacturer at the time of purchase, may be provided to the digital twin module 221 and/or stored as a digital twin model 223, or as part of one or more digital twin files maintained in a repository. In other embodiments, the creation engine 225 may receive specifications of the manufacturing assets 207 from the manufacturer in the form of one or more files describing the specifications of manufacturing asset 207. Embodiments of the creation engine 225 may create a digital twin model 223 depicting the original base form of the manufacturing asset 207 being supplied (e.g., referred to as the "base asset") from the initial files received describing the manufacturing asset 207.

Embodiments of the creation engine 225 may further create new or updated digital twin models 223 representing new or updated versions of the manufacturing asset 207 over time. As each manufacturing asset 207 connected to the network 250 changes over time, including changes to one or more components, configurations, hardware, software, firmware, asset monitoring devices 231, maintenance, repairs, etc., the creation engine 225 may create a new digital twin model 223 reflecting the current state and/or condition of the manufacturing asset 207 as a digital twin. In some embodiments, the multiple versions of the digital twin models 223 can be sequenced or stored using a time-based scale and/or timeline to track the evolution of the manufacturing asset 207 and the progression of subsequent changes to the asset.

Changes to the manufacturing asset 207 that may result in the creation of a new digital twin model 223 may be automatically created in response to changes in the configuration or operating conditions of a manufacturing asset 207. For example, a manufacturing asset 207 may receive repairs, maintenance, reconfigure asset settings 233 and/or install or remove components on the manufacturing asset 207. In response to the changes, the creation engine 225 may create a new version of the digital twin model 223 to reflect the changes and store the new digital twin model 223 within a repository and/or as part of the timeline tracking the evolution of the manufacturing asset 207. In other instances, embodiments of the digital twin model 223 may be tracked based on changes to performance data collected by one or more asset monitoring devices 231 or environment monitoring devices 235, including but not limited to one or more sensor devices, IoT devices and/or recording systems connected to the manufacturing asset 207. Collected performance data and other data describing the manufacturing asset 207 may indicate the presence of changes to the manufacturing asset 207. Accordingly based on changes to the collected data being monitored, new digital twin models 223 may be created. For instance, one or more parts or components connected to the manufacturing asset 207 may communicate or broadcast information to the monitoring devices 231, 235 collecting data about the manufacturing asset 207, including makes and models of the component. If new components or parts are detected, such a change may be relayed to the digital twin module 221, resulting in the creation of a new digital twin model 223 to reflect changes of the manufacturing asset 207.

In some embodiments, the presence of new components, configurations or other changes to the manufacturing asset 207, including degradation of the manufacturing asset 207 may be deduced by the performance characteristics of the data collected by the monitoring devices 231, 235. Deviations between previously collected performance data and current data sets of performance data can result in an identification of changes to the manufacturing asset 207 and/or the overall health and efficiency of the manufacturing asset 207. For example, changes in performance may indicate the degradation of existing parts, new or replacement parts or components, modified configurations and asset settings 233, software or firmware update, damage, repairs, etc. Embodiments of the digital twin module 221 may analyze the performance changes based on the changes in the performance data collected and reflect the changes to the manufacturing asset 207 as a new digital twin model 223 in some embodiments. In other embodiments, the digital twin module 221 may report the detected changes in performance data to the metrics module 217, along with additional performance or lifecycle insights, and recommendations for compensating for such changes to operating conditions of the manufacturing assets 207, as reflected by the digital twin models 223.

Embodiments of the digital twin module 221 may comprise a data collection engine 227. The data collection engine 227 may perform the functions, tasks or operations associated with collecting, organizing, maintaining, formatting and/or storing performance data and other data sets (collectively referred to as "collected datasets") generated by the sensor devices, IoT devices, recording system(s) and other asset monitoring devices 231 or environment monitoring devices 235 connected to or communicating with the manufacturing asset 207. The collected datasets generated by the monitoring devices 231, 235 of the manufacturing assets 207, may be stored within one or more data storage solutions, which may be part of one or more data processing systems 100 onboard the manufacturing asset 207 in some embodiments. In some embodiments, data collected by the data collection engine 227 may be captured as a real-time data feed streamed by one or more monitoring devices 231, 235 providing the data to the data collection engine 227. In other embodiments, the data storage maintaining the collected datasets may be distributed across the network 250 and/or stored locally by a networked-connected data storage systems or repository, which may be accessible by other nodes on the network 250. For example, by metrics module 217 of the order dressing module 211.

During operation of the manufacturing asset 207, asset monitoring devices 231 equipped by the manufacturing asset 207 can generate data and metadata describing the operation, functionality and performance of the manufacturing asset 207. The collected datasets that are generated by the asset monitoring devices 231, can describe the overall health and performance of the manufacturing asset 207 in its current state, help diagnose potential maintenance needs, repairs or failing parts that may need replacement or affect future performance. Embodiments of the asset monitoring devices 231 integrated into the manufacturing asset 207 can also provide error or diagnostic codes, which may further assist with identifying potential performance issues and changes in operating conditions. Through the use of the collected datasets, organized, analyzed and/or formatted by the data collection engine 227, the digital twin module 221 may analyze each of the manufacturing assets' 207 performance, identify failing parts, provide resolutions to cure errors or diagnostic codes and recommend optimal actions to improve or optimize performance of the manufacturing asset 207 based on one or more simulations.

Embodiments of the digital twin module 221 may further use the collected data to aid in the performance of one or more simulations that may simulate manufacturing asset 207 performance within the digital twin model 223 and/or provide simulations using various scenarios of the digital twin models 223 to predict results implementing one or more changes to the configuration of manufacturing asset 207. For example, simulations predicting effects of replacing particular parts, changing timings, adjusting asset settings 233 for manufacturing products, modifying onboard electrical or computing components or even replacing potentially defective asset monitoring devices 231 and/or environment monitoring devices 235. Data sets collected by the data collection engine 227 may contribute to building one or more simulation models that may be used by a simulation engine. In some embodiments, manufacturers and/or users of the manufacturing asset 207 may share the collected datasets amongst owners of the same manufacturing asset 207 to improve modeling that uses the data, increasing the overall amounts of data available amongst the community of owners, thus improving the prediction models, performance insights, simulation results and recommendations.

Embodiments of the digital twin module 221 may comprise a reporting module 229. The reporting module 229 may perform functions, tasks and/or processes of the digital twin module 221 which may be directed toward reporting simulation results for digital twin models 223 of manufacturing assets 207, as well as provide to the order dressing module 211 with additional digital twin data that may be considered by the reinforcement learning model 215, including performance and lifecycle insights about the manufacturing assets 207 and recommendations for alleviating changes in operating conditions or performance changes. In some embodiments of the reporting module 229, the reporting module 229 may save and archive the simulation results to one or more files of a repository or database, which may be accessed by the order dressing module 211. Metrics module 217 may request the reporting module 229 to retrieve archived simulation results from previous simulations of the manufacturing assets 207 and provide the archived simulation results of the manufacturing assets 207, along with any recommendations or insights into the training module 213.

Embodiments of the order dressing module 211 may include a feedback module 219. The feedback module 219 may perform the functions, tasks and processes of the order dressing module 211 associated with retrieving feedback from one or more manufacturing assets 207 regarding the outputted product of the manufacturing assets 207, and the quality characteristics of the manufactured product. In some embodiments, the feedback module 219 may report the quality characteristics of the manufactured product as raw data to the training module 213, wherein the training module 213 may assess whether the quality characteristics meet the requirements of the commercial characteristics prescribed in the order. The training module 213 may further refine the reinforcement learning model 215 by applying any rewards or penalties being applied to the model. In some embodiments the feedback module 219 may process the quality characteristics measured by one or more manufacturing assets 207. For example, feedback module 219 may compare the commercial characteristics of the order describing the parameters of the product being produced with the quality characteristics measured for the manufactured product. Based on the comparison of the quality characteristics and the commercial characteristics, feedback module 219 may indicate to the training module 213 the results and/or whether the manufactured product succeeded in achieving the commercial characteristics and/or detail which measured characteristics were incorrect and the value by which the failing characteristics missed the required values.

Embodiments of manufacturing assets 207 may not simply be a single systems or machine producing the product and recording the final quality measurements. Rather, in some instances, a manufacturing asset 207 may comprise a plurality of systems that as a whole may be considered the manufacturing asset 207 or a manufacturing system. In some embodiments, the manufacturing asset 207 creating the on-specification product as required by the commercial characteristics may include a manufacturing execution system (MES), a distributed control system (DCS) and a laboratory information management system (LIMS). The MES may be the portion of the manufacturing asset receiving and/or storing the manufacturing characteristics (and other production-related parameters) for producing the product as prescribed by the reinforcement learning model 215.

Embodiments of the DCS stores the asset settings 233 for creating the product consistent with the manufacturing characteristics transmitted to the MES and executes the production of the product using one or more tools of the manufacturing asset 207 to construct the product. The LIMS may perform the quality inspection of the product produced by the DCS. For example, LIMS of the manufacturing asset 207 may measure, record and transmit the quality characteristics of the final product to the feedback module 219.

Figure 3:
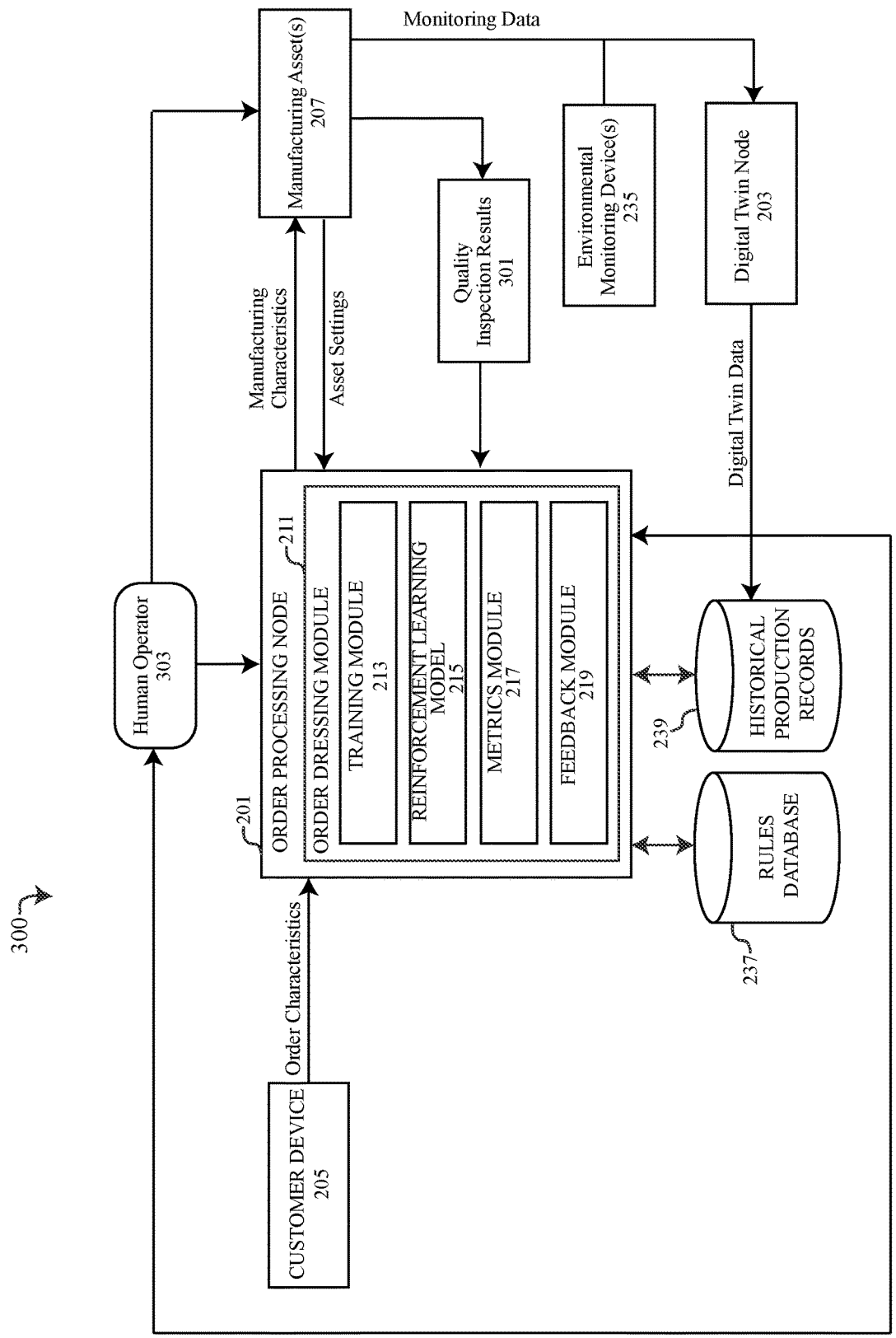
FIG. 3 depicts a block diagram comprising a workflow describing a computing environment for dynamically adjusting manufacturing characteristics to produce an on-specification product in accordance with the present disclosure.

Referring to the drawing of FIG. 3, FIG. 3 illustrates an embodiment of workflow depicting the cycle of product production from order receipt to order dressing, production and refinement of the reinforcement learning model 215 to dynamically predict and adjust business rules being executed to arrive at a product that matches the quality characteristics and production parameters prescribed by a customer. As shown in the workflow diagram, order characteristics for the requested product are transmitted by a customer device 205 to an order processing node 201. Commercial characteristics describing the requested product can be inputted into the trained reinforcement learning model 215 of the order processing node 201. The reinforcement learning model 215 translates the commercial characteristics of the requested product order and outputs proposed manufacturing characteristics. The proposed manufacturing characteristics of the reinforcement learning model may include grade of materials, dimensions, routing for production, equipment settings, etc. The outputted manufacturing characteristics may be based on the historical production records 239 for similar types of orders and products, which have historically provided a maximum reward to the agent of the reinforcement learning model 215 and also adjust one or more rules of the rules database to compensate for changes to the operating conditions, performance, insights or recommendations of the data from one or more digital twins reflecting the current state of manufacturing assets 207 needed for completing the current production order.

In the exemplary embodiment of the workflow depicted in FIG. 3, the outputted manufacturing characteristics prescribed by the reinforcement learning model 215 can be sent from the order processing node 201 to one or more manufacturing assets 207. For example, transferring the proposed manufacturing characteristics to the MES or a rules engine of the manufacturing asset 207 for production of the product. Embodiments of the MES or other rules engine may set the initials rules for manufacturing the product in accordance with the prescribed manufacturing characteristics. The DCS of the manufacturing asset 207 may change the one or more equipment settings (i.e., the asset settings 233) of the manufacturing asset 207 and store the settings to a memory device. The DCS of the manufacturing asset 207 may engage one or more tools or functions of the manufacturing asset to transform the prescribed materials into a finished product comprising the requested characteristics of the customer's order. For example, manufacturing or machine tools of manufacturing assets 207 may include (but are not limited to) machining technology such as boring tools, cutting tools, drilling tools, milling tools, turning tools; burning technology such as laser cutting machines, oxyfuel cutting machines, and plasma cutting machines; CNC machines including drills, lathes and milling machines, grinding, welding, casting and mounting machines.

When production is completed by the DCS of the manufacturing asset 207, the LIMS may measure the quality characteristics of the completed product and record them. The quality inspection results 301, along with the asset settings 233 may be transmitted back to the order processing node 201. For example, by transferring the quality inspection results 301 and/or the asset settings 233 to the feedback module 219. Feedback module 219 may record the quality inspection results 301 and the asset settings 233 to the historical production records 239. Moreover, monitoring data may be collected by the environment monitoring devices 235 and asset monitoring devices 231 onboard the manufacturing asset 207 during production of the product and may be transmitted to the data collection engine 227 of the digital twin node 203 Digital twin data, including performance data, simulation data, lifecycle insights of the manufacturing assets 207, and recommendations can be transmitted to the order processing node 201, stored in the historical production records 239 and/or transmitted to one or more human operators 303 for additional actions or inputs.

The quality characteristics described by the quality inspection results 301 may be compared with the commercial characteristics originally received from the customer device 205, prescribing the parameters of the product to be manufactured. In instances where the quality characteristics match the commercial characteristics, the training module 213 may reward the reinforcement learning model 215, for a job well done. Conversely, in instances where the quality characteristics recorded do not match the commercial characteristics of the original production requests training module 213 may apply a penalty to the reinforcement learning model 215. Moreover, the reinforcement learning model 215 may consider the updated digital twin data, quality characteristics of the failed production, and the updated historical production records, including the asset settings 233 of the manufacturing assets 207 that led to the failed product, in order to modify one or more rules within the rules database 237. Using the updated information and rules, the reinforcement learning model 215 may repeat the manufacturing process again with a revised set of manufacturing characteristics translated from the commercial characteristics which differ from the failed production of the product that did not meet the quality characteristics. The entire process may be repeated until the quality inspection results 301 match the commercial characteristics and/or a human operator 303 intervenes by either cancelling production or manually updates the rules database 237 and/or the reinforcement learning model.

Figure 6:
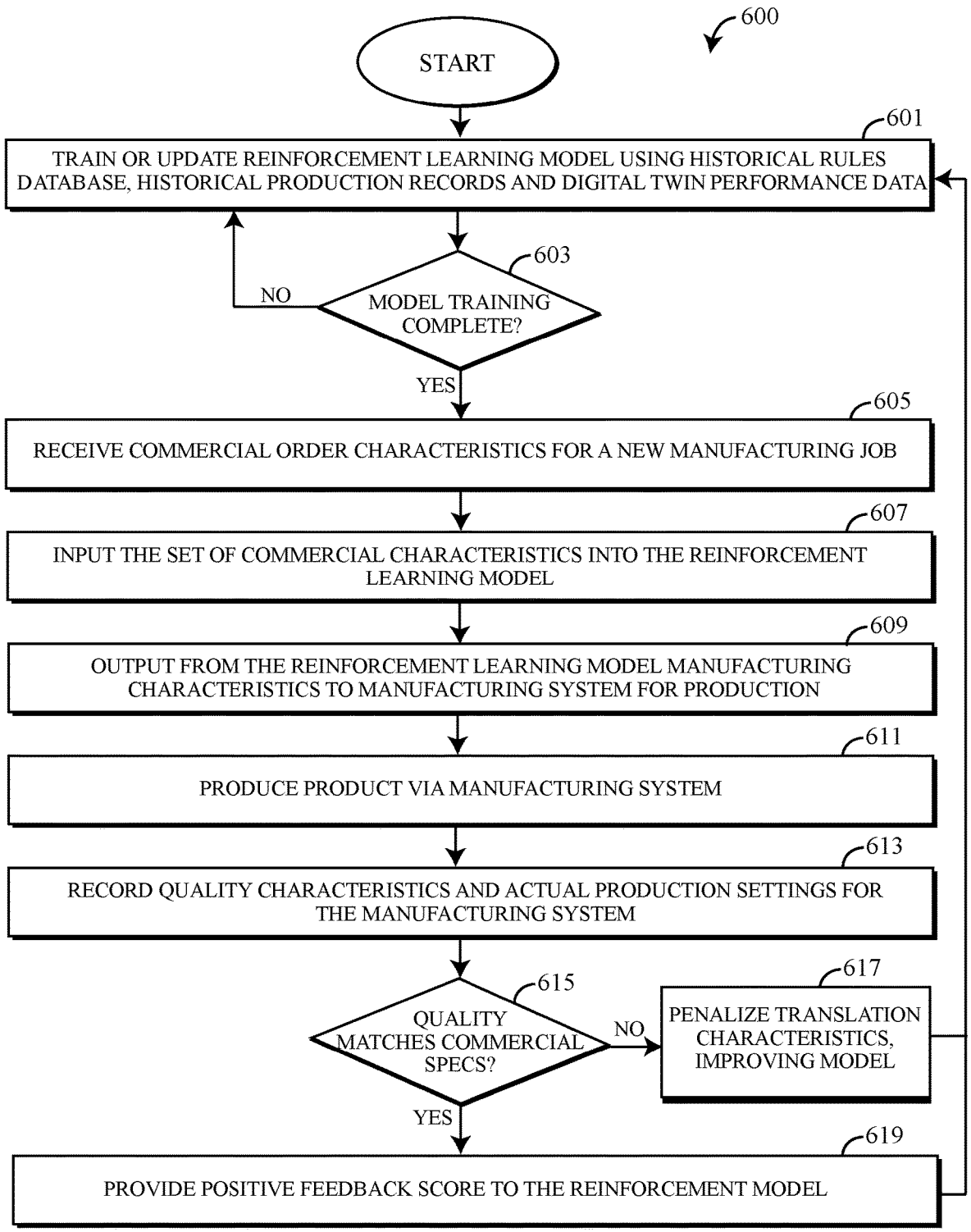
FIG. 6 depicts a flow diagram describing an embodiment of a method for dynamically adjusting manufacturing characteristics to produce an on-specification product in accordance with the present disclosure.

Method for Dynamically Augmenting Manufacturing Characteristics Configured to Produce an on-Specification Product The drawings of FIG. 6 represents an embodiment of a method for dynamically adjusting manufacturing characteristics to produce an on-specification product, as described in accordance with FIGS. 2-5 above, using one or more computing systems defined generically by computing system 100 of FIG. 1; and more specifically by the embodiments of specialized computer systems depicted in FIGS. 2-5 and as described herein. A person skilled in the art should recognize that the steps of the method described in FIG. 6 may be performed in a different order than presented and may not require all the steps described herein to be performed.

The embodiment of the method 600 may begin at step 601. During step 601 the reinforcement learning model may be trained to learn the order dressing rules of a rules database 237 comprising a collection of historical rules used to produce manufactured products within required specifications. Moreover, historical production records 239 of past manufacturing runs can teach the reinforcement learning model how on-specification products of a particular quality have been previously created, the routes of production, grade of materials used, etc. Based on the history of input material grades used, the output quality of the products produced, and process parameters, along with conditions of manufacturing assets 207 as described by digital twin data contributed to the historical production records 239, algorithms of the reinforcement learning model 215 establish a co-relation and are taught to recommend corresponding inputs and process parameters (i.e., order dressing parameters) calculated to provide the highest probability of reaching correct output quality on the first attempt at manufacturing requested products.

In step 603, a determination is made whether or not the training of the reinforcement learning model 215 is completed. If the reinforcement learning model 215 is trained and ready for performing translations of commercial characteristics of product orders to manufacturing characteristics for production, the method 600 may proceed to step 605, otherwise, the training module 213 may continue to provide training data and historical examples to the reinforcement learning model 215. During step 605, an order processing node 201 may receive a request from a customer device 205 comprising commercial characteristics for a manufacturing job, including characteristics for the route of production, equipment settings including processing time, the number of passes, etc., quality parameters for the final product, material requirements, marking and testing for finished products, and any other characteristics that a person skilled in the art may need to produce a finished, manufactured product.

During step 607 of method 600, the set of commercial characteristics received during step 605 may be inputted into the reinforcement learning model 215. Embodiments of the reinforcement learning model may translate the commercial characteristics of the inputted request into manufacturing characteristics, by applying one or more business rules for converting the commercial characteristics into manufacturing characteristics, taking into account production rules and constraints, quality rules, technology limitations, restraints, the historical production records 239 used to train the model as well as digital twin data describing the current state of the manufacturing assets 207 that may be used to produce the finished product. The reinforcement learning model can infer equipment condition from historical production sequences and digital twin data and adjust the order dressing rules to compensate for variations in material grade, degradation of machinery, etc., and still achieve the correct quality of product.

In step 609, the reinforcement learning model outputs proposed manufacturing characteristics for achieving the requested product to one or more systems for production by a manufacturing asset 207. For instance, an MES configures the initial set of rules for the manufacturing characteristics being implemented by the manufacturing asset 207 and DCS stores the asset settings 233 of the equipment being used for production. Examples of manufacturing characteristics can include the material grades, dimensions, the best production route, etc. to achieve the product within the requested quality and specifications while adhering to the constraints, and limitations set forth by the commercial characteristics and accounting for the state of the manufacturing assets 207. Once rules and settings for the manufacturing asset 207 are configured for production, in step 611, the materials being manufactured into a product can be routed to the manufacturing asset 207 and one or more tools may be applied to the materials in accordance with the rules and asset settings, producing a final product.

In step 613, the final product produced by the manufacturing assets 207 can be measured for quality characteristics and recorded. For example, the LIMS of the manufacturing assets 207 can inspect the final product, measure the quality characteristics of the finished product and record the quality characteristics to the historical production records 239. Moreover, actual production settings and settings for the manufacturing asset (i.e., asset settings 233) used to the produce the product can also be recorded, for future reference by the reinforcement learning model 215. In step 615, a determination can be made whether or not the quality characteristics measured by the LIMS matches the commercial characteristics of the initial request by comparing the quality characteristics to the commercial characteristics. If the quality matches the commercial specs, in step 619 the reinforcement learning model 215 is rewarded by providing a positive feedback score, indicating to the model that the translation from commercial characteristics to manufacturing characteristics we accurate and correctly accounted for not only the business rules, but also the current operating conditions of the manufacturing assets 207 and digital twin data.

Conversely, if the quality characteristics of the final product produced do not match the commercial characteristics (or are not within an acceptable threshold for deviation) the method 600 proceeds to step 617, wherein the reinforcement learning model 215 is penalized. Moreover, the method 600 may return to step 601 wherein the reinforcement learning model 215 is updated and fine-tuned based on the results of the most recent production failure. The rules of the rules database 237 may be adjusted based on the updated historical records, and digital twin data to account for changes in operating conditions of the manufacturing assets 207 as well as any accuracy metrics collected by metrics module 217. A revised production run to create the product may proceed using the updated reinforcement model in an attempt to achieve the correct quality characteristics using a revised set of manufacturing characteristics outputted by the reinforcement learning model 215.

What is claimed is:

1. A computer-implemented method for dynamically augmenting manufacturing characteristics configured to produce an on-specification product, the method comprising:
    developing, by a processor, a reinforcement learning model using a historical rules database comprising existing rules translating commercial characteristics of a product into the manufacturing characteristics, and historical production settings comprising quality parameters achieved during historical production of on-specification products in accordance with the existing rules;
    inputting, by the processor, a set of commercial characteristics to produce the product, wherein the product is steel, and a detected degradation of one or more product manufacturing equipment into the reinforcement learning model;
    receiving, by the processor, output from the reinforcement learning model translating the set of commercial characteristics into manufacturing characteristics;
    producing the product, by the processor controlling the one or more product manufacturing equipment, with adjustments to the manufacturing characteristics to compensate for the detected degradation of the one or more product manufacturing equipment;
    recording, by the processor, quality characteristics of the product produced by one or more manufacturing systems and production settings of the one or more manufacturing systems used to produce the product;
    comparing, by the processor, the quality characteristics of the product produced by the one or more manufacturing systems with the commercial characteristics of the product;
    rewarding, by the processor, the reinforcement learning model for correctly translating the commercial characteristics to the manufacturing characteristics, whereupon the quality characteristics of the product match the commercial characteristics; and
    penalizing, by the processor, the reinforcement learning model for incorrectly translating the commercial characteristics to the manufacturing characteristics, whereupon the quality characteristics of the product do not match the commercial characteristics.

2. The computer-implemented method of claim 1, further comprising: analyzing, by the processor, changes in operating conditions of the one
    or more
    manufacturing systems producing the product; and
    modifying, by the processor, the reinforcement learning model to predictively compensate for the changes in the operating conditions of the one or more manufacturing systems.

3. The computer-implemented method of claim 2, wherein the changes in the operating conditions of the one or more manufacturing systems producing the products are measured by sensor data collected by one or more sensors onboard the one or more manufacturing systems or positioned within a surrounding environment of the one or more manufacturing systems.

4. The computer-implemented method of claim 3, further comprising:
    tracking, by the processor, the sensor data in real time;
    inputting, by the processor, the sensor data into a digital twin, and reflecting the changes in the operating conditions of the one or more manufacturing systems in the digital twin;
    assessing, by the processor, performance and lifecycle of the one or more manufacturing systems as a function of the changes in the operating conditions as measured by the sensor data using the digital twin to simulate the one or more manufacturing systems under the changes to the operating conditions and comparing simulation results to historical baseline performance of the one or more manufacturing systems using the historical production settings; and
    recommending, by the processor, an adjustment to the settings of the one or more manufacturing systems or the existing rules used to translate commercial characteristics of the product into the manufacturing characteristics to compensate for changes in the operating conditions in order to achieve correctly translated manufacturing characteristics from the commercial characteristics.

5. The computer-implemented method of claim 1, wherein the manufacturing characteristics include mechanical properties, chemical properties, tolerance properties, grade, or dimensions of the product.

6. The computer-implemented method of claim 2, further comprising: capturing, by
    the processor, one or more metrics indicating degradation of equipment comprising the one or more manufacturing systems;
    inputting, by the processor, the one or more metrics into the reinforcement learning model; and adjusting, by the processor, the existing rules of the reinforcement learning model to compensate for the degradation of the equipment manufacturing the product.

7. A computer program product comprising:
one or more computer readable storage media having computer-readable program instructions stored on the one or more computer readable storage media, said program instructions executes a computer-implemented method comprising:
   developing, by a processor, a reinforcement learning model using a historical rules database comprising existing rules translating commercial characteristics of a product into manufacturing characteristics, and historical production settings comprising quality parameters achieved during historical production of on-specification products in accordance with the existing rules;
   inputting, by the processor, a set of commercial characteristics to produce the product, wherein the product is steel, and a detected degradation of one or more product manufacturing equipment into the reinforcement learning model;
   receiving, by the processor, output from the reinforcement learning model translating the set of commercial characteristics into manufacturing characteristics;
   producing the product, by the processor controlling the one or more product manufacturing equipment, with adjustments to the manufacturing characteristics to compensate for the detected degradation of the one or more product manufacturing equipment;
   recording, by the processor, quality characteristics of the product produced by one or more manufacturing systems and production settings of the one or more manufacturing systems used to produce the product;
   comparing, by the processor, the quality characteristics of the product produced by the one or more manufacturing systems with the commercial characteristics of the product;
   rewarding, by the processor, the reinforcement learning model for correctly translating the commercial characteristics to the manufacturing characteristics, whereupon the quality characteristics of the product match the commercial characteristics; and
   penalizing, by the processor, the reinforcement learning model for incorrectly translating the commercial characteristics to the manufacturing characteristics, whereupon the quality characteristics of the product do not match the commercial characteristics.

8. The computer program product of claim 7, further comprising: analyzing, by the processor, changes in operating conditions of the one
or more
manufacturing systems producing the product; and
   modifying, by the processor, the reinforcement learning model to predictively compensate for the changes in the operating conditions of the one or more manufacturing systems.

9. The computer program product of claim 8 wherein the changes in the operating conditions of the one or more manufacturing systems producing the products are measured by sensor data collected by one or more sensors onboard the one or more manufacturing systems or positioned within a surrounding environment of the one or more manufacturing systems.

10. The computer program product of claim 9 further comprising:
   tracking, by the processor, the sensor data in real time;
   inputting, by the processor, the sensor data into a digital twin, and reflecting the changes in the operating conditions of the one or more manufacturing systems in the digital twin;
   assessing, by the processor, performance and lifecycle of the one or more manufacturing systems as a function of the changes in the operating conditions as measured by the sensor data using the digital twin to simulate the one or more manufacturing systems under the changes to the operating conditions and comparing simulation results to historical baseline performance of the one or more manufacturing systems using the historical production settings; and
   recommending, by the processor, an adjustment to the settings of the one or more manufacturing systems or the existing rules used to translate commercial characteristics of the product into the manufacturing characteristics to compensate for changes in the operating conditions in order to achieve correctly translated manufacturing characteristics from the commercial characteristics.

11. The computer program product of claim 7, wherein the manufacturing characteristics include mechanical properties, chemical properties, tolerance properties, grade, or dimensions of the product.

12. The computer program product of claim 8, further comprising:
   capturing, by the processor, one or more metrics indicating degradation of equipment comprising the one or more manufacturing systems;
   inputting, by the processor, the one or more metrics into the reinforcement learning model; and
   adjusting, by the processor, the existing rules of the reinforcement learning model to compensate for the degradation of the equipment manufacturing the product.

13. A computer system comprising: a
processor;
one or more manufacturing systems in communication with the processor; and
a computer-readable storage media coupled to the processor, wherein the computer-readable storage media contains program instructions executing a computer-implemented method comprising the steps of:
   developing, by the processor, a reinforcement learning model using a historical rules database comprising existing rules translating commercial characteristics of a product into manufacturing characteristics, and historical production settings comprising quality parameters achieved during historical production of on-specification products in accordance with the existing rules;
   inputting, by the processor, a set of commercial characteristics to produce the product, wherein the product is steel, and a detected degradation of one or more product manufacturing equipment into the reinforcement learning model;
   receiving, by the processor, output from the reinforcement learning model translating the set of commercial characteristics into manufacturing characteristics;
   producing the product, by the processor controlling the one or more product manufacturing equipment, with adjustments to the manufacturing characteristics to compensate for the detected degradation of the one or more product manufacturing equipment;

recording, by the processor, quality characteristics of the product produced by the one or more manufacturing systems and production settings of the one or more manufacturing systems used to produce the product;

comparing, by the processor, the quality characteristics of the product produced by the one or more manufacturing systems with the commercial characteristics of the product;

rewarding, by the processor, the reinforcement learning model for correctly translating the commercial characteristics to the manufacturing characteristics, whereupon the quality characteristics of the product match the commercial characteristics; and penalizing, by the processor, the reinforcement learning model for incorrectly translating the commercial characteristics to the manufacturing characteristics, whereupon the quality characteristics of the product do not match the commercial characteristics.

14. The computer system of claim 13, further comprising:

analyzing, by the processor, changes in operating conditions of the one or more manufacturing systems producing the product; and modifying, by the processor, the reinforcement learning model to predictively compensate for the changes in the operating conditions of the one or more manufacturing systems.

15. The computer system of claim 14, wherein the changes in the operating conditions of the one or more manufacturing systems producing the products are measured by sensor data collected by one or more sensors onboard the one or more manufacturing systems or positioned within a surrounding environment of the one or more manufacturing systems.

16. The computer system of claim 15, further comprising:

tracking, by the processor, the sensor data in real time;

inputting, by the processor, the sensor data into a digital twin, and reflecting the changes in the operating conditions of the one or more manufacturing systems in the digital twin;

assessing, by the processor, performance and lifecycle of the one or more manufacturing systems as a function of the changes in the operating conditions as measured by the sensor data using the digital twin to simulate the one or more manufacturing systems under the changes to the operating conditions and comparing simulation results to historical baseline performance of the one or more manufacturing systems using the historical production settings; and recommending, by the processor, an adjustment to the settings of the one or more manufacturing systems or the existing rules used to translate commercial characteristics of the product into the manufacturing characteristics to compensate for changes in the operating conditions in order to achieve correctly translated manufacturing characteristics from the commercial characteristics.

17. The computer system of claim 14, further comprising:

capturing, by the processor, one or more metrics indicating degradation of equipment comprising the one or more manufacturing systems;

inputting, by the processor, the one or more metrics into the reinforcement learning model; and adjusting, by the processor, the existing rules of the reinforcement learning model to compensate for the degradation of the equipment manufacturing the product.

* * * * *